(12) United States Patent
Schwarz

(10) Patent No.: US 7,077,163 B2
(45) Date of Patent: Jul. 18, 2006

(54) DEVICE FOR CONTROLLING THE FLOW OF LIQUID OR GASEOUS MEDIA

(76) Inventor: Alois Schwarz, Schwendterstrasse 28, Kirchdorf (AT) A-6382

( * ) Notice: Subject to any disclaimer, the term of this patent is extended or adjusted under 35 U.S.C. 154(b) by 0 days.

(21) Appl. No.: 11/242,493

(22) Filed: Oct. 3, 2005

(65) Prior Publication Data

US 2006/0027273 A1 Feb. 9, 2006

Related U.S. Application Data

(63) Continuation of application No. PCT/AT04/000067, filed on Mar. 4, 2004.

(30) Foreign Application Priority Data

Apr. 3, 2003 (AT) ................................ A 521/2003

(51) Int. Cl.
*F16K 11/20* (2006.01)
(52) U.S. Cl. ..................................... 137/883
(58) Field of Classification Search ............... 137/883, 137/547
See application file for complete search history.

(56) References Cited

U.S. PATENT DOCUMENTS

| | | | | | |
|---|---|---|---|---|---|
| 206,611 | A | * | 7/1878 | Rainey | 137/299 |
| 406,950 | A | * | 7/1889 | Parsons | 137/883 |
| 456,546 | A | * | 7/1891 | Blankerts | 137/883 |
| 808,654 | A | * | 1/1906 | Hartgrave | 137/883 |
| 1,203,998 | A | * | 11/1916 | Fletcher | 141/302 |
| 1,472,265 | A | * | 10/1923 | Bell | 137/883 |
| 1,532,253 | A | * | 4/1925 | Meredith et al. | 166/91.1 |
| 1,534,406 | A | * | 4/1925 | Martocello | 137/883 |
| 2,275,608 | A | * | 3/1942 | Brisbane | 137/613 |
| 3,190,310 | A | * | 6/1965 | Honsinger | 137/583 |
| 3,464,447 | A | * | 9/1969 | Norman | 137/883 |
| 3,516,638 | A | * | 6/1970 | Piggott | 251/175 |
| 4,570,677 | A | | 2/1986 | Roxton et al. | |
| 4,749,004 | A | | 6/1988 | Peash | |
| 5,159,957 | A | * | 11/1992 | Hehl | 137/883 |
| 5,232,023 | A | * | 8/1993 | Zimmerly | 137/637.2 |
| 5,743,295 | A | | 4/1998 | Alcock et al. | |
| 5,906,223 | A | | 5/1999 | Pinkham | |
| 6,089,263 | A | * | 7/2000 | Dumser | 137/552 |

FOREIGN PATENT DOCUMENTS

| | | |
|---|---|---|
| DE | 1 239 151 | 4/1967 |
| EP | 0 829 716 A1 | 3/1998 |
| WO | WO 97/04372 | 2/1997 |

\* cited by examiner

*Primary Examiner*—John Fox
(74) *Attorney, Agent, or Firm*—Laurence A. Greenberg; Werner H. Stemer; Ralph E. Locher

(57) ABSTRACT

A device controls the flow of liquid or gaseous media, especially a liquid heating or cooling medium, in a line system with a first channel that contains a valve, especially a shut-off valve, and is provided with connections on both ends thereof. Two other channels are located on said first channel, on both sides of the valve thereof, said other channels being perpendicularly oriented in relation to the first channel and having flow channels which are connected to the first channel by means of connection channels. Connections are also provided on the ends of said other channels, and valves, especially shut-off valves, are also provided in the connection channels.

13 Claims, 18 Drawing Sheets

DEVICE FOR CONTROLLING THE FLOW OF LIQUID OR GASEOUS MEDIA

CROSS-REFERENCE TO RELATED APPLICATION

This is a continuing application, under 35 U.S.C. § 120, of copending international application No. PCT/AT2004/000067, filed Mar. 4, 2004, which designated the United States; this application also claims the priority, under 35 U.S.C. § 119, of Austrian patent application No. A 521/2003, filed Apr. 3, 2003; the prior applications are herewith incorporated by reference in their entirety.

BACKGROUND OF THE INVENTION

Field of the Invention

The present invention relates to a device for controlling the flow of liquid or gaseous media, in particular a liquid heating or cooling medium, in a line system comprising a first channel, wherein a valve, in particular a shut-off valve, is located and at both ends of which connections are provided.

Inline systems for technical installations, such as, for example, heating installations, air-conditioning installations and sanitation installations, it is necessary selectively to conduct liquid or gaseous media in different flow channels in order thereby to obtain different effects or in order to meet different technical requirements. It is thus necessary, for example in a heating installation, to conduct the heating medium located in the heating system into a device wherein air which is contained in the heating medium is removed therefrom. This is because if there is no venting, air accumulates in the heating devices, for example in the lines of a floor heating system or of a wall heating system, causing a reduction in the efficiency of the heating devices or possibly resulting in malfunctions. Similarly, it is necessary, in the case of installations which contain filters, to clean the filters by flushing them with a cleaning liquid in the opposite direction to the filtering operation. Analogous flushings are also required in the case of catalytic converters.

In order to be able to undertake measures of this type, it is known to arrange control valves, in particular three-way directional control valves, in the line systems, the reversal of which valves can be used to bring about the required diversions. Since it may be necessary in this case to provide line systems with a multiplicity of reversing valves, a large outlay on installation or a very large outlay on costs is thus caused. In addition, breakdowns affecting the entire line system may be caused by failures of individual valves.

SUMMARY OF THE INVENTION

It is accordingly an object of the invention to provide a valve configuration and a method of using a valve which overcomes the above-mentioned disadvantages of the heretofore-known devices and methods of this general type and which provides for a device for controlling the flow of fluid media, such as liquids or gases, and by means of which a substantially enlarged number of diversions can be undertaken in a line system in comparison with prior art control valves.

With the foregoing and other objects in view there is provided, in accordance with the invention, a device for controlling a flow of fluidic media, such as liquid heating or cooling media. The device comprises:

a single first channel with two ends and a first valve, preferably a shutoff valve, connected in the first channel;

flow connections at the two ends of the first channel;

two mutually parallel, second channels extending substantially perpendicularly to the first channel;

the first channel being located at a distance from a plane formed by the two second channels;

second valves, such as shutoff valves, connecting the first channel with the two second channels; and wherein the first valve in the first channel is disposed between the second valves leading to the two second channels.

In other words, the objects of the invention are achieved by assigning two further channels to the first channel, on both sides of the valve, which channels are oriented transversely to the first channel, are connected to the first channel via connecting channels and at the ends of which connections are provided, with valves, in particular shut-off valves, likewise being located in the connecting channels.

The two further channels, referred to as second channels, are preferably oriented at right angles to the first channel. Furthermore, at least some of the valves are preferably constructed with a respective control device. According to a preferred further feature, the valve located in the first channel is located at least approximately centrally between the two further channels. Furthermore, sensors can be arranged in the channels and are used to fulfill control functions as a function of parameters of the media flowing in the channels. The channels are preferably constructed at their ends with connecting flanges or at in each case one of their ends with an external thread and at the other end with a union nut. The parameters may be formed by the quantities or the temperatures of the media.

The device is preferably produced from a plastics material, in particular from glass-fiber-reinforced polyphthalimide, which is constructed with channels into which the valves, which are produced in particular from brass, from ceramic or from plastics, are inserted.

Other features which are considered as characteristic for the invention are set forth in the appended claims.

Although the invention is illustrated and described herein as embodied in a device for controlling the flow of liquid or gaseous media, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
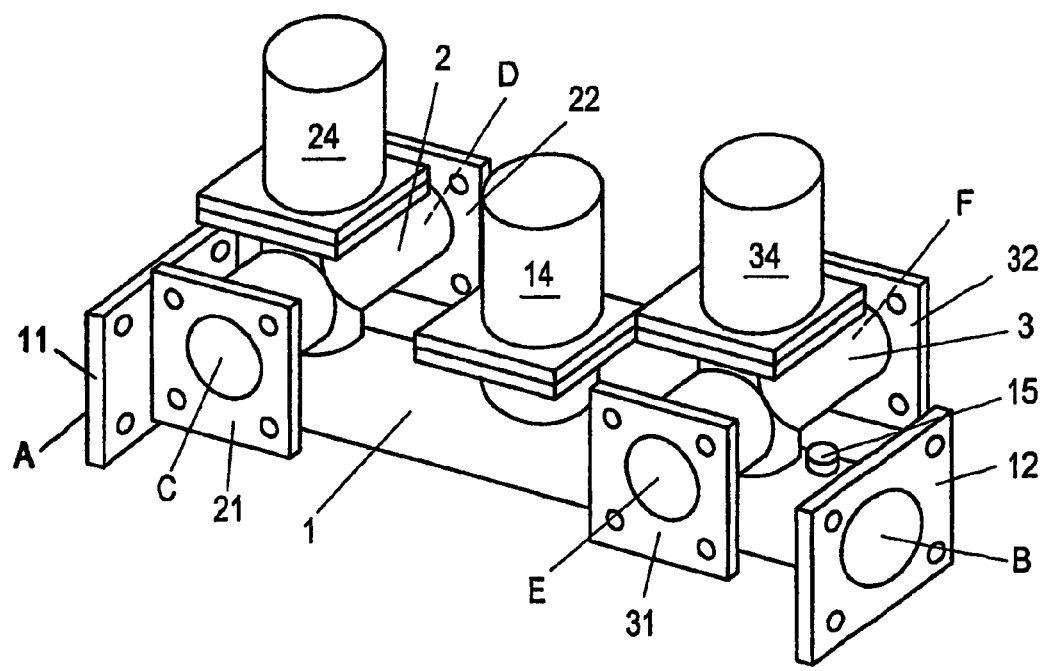
FIG. 1 shows a first embodiment of a device according to the invention, in an axonometric illustration.

Referring now to the figures of the drawing in detail and first, particularly, to FIGS. 1–5 thereof, there is shown a device according to the invention which comprises a first pipe length 1 which is constructed at both of its ends with connecting flanges 11 and 12. Located above the first pipe length 1 are two further pipe lengths 2 and 3 which are oriented at right angles to the first pipe length 1, are connected to the first pipe length 1 and are furthermore constructed at their ends with connecting flanges 21 and 22 and 31 and 32. Located within a first flow channel 10 formed in the first pipe length 1 is a first shut-off valve 13 to which a control device, for example an electric servomotor 14, is assigned. The first flow channel 10 of the first pipe length 1 is connected via connecting channels to second flow channels 20 and 30 of the two further pipe lengths 2 and 3, with further shut-off valves 23 and 33 (second valves 23, 33), to which further control devices, for example electric servomotors 24 and 34, are assigned, being located within the connecting channels. The control devices may also be formed, for example, by thermocouples.

This device has six inputs and outputs A, B, C, D, E and F which are connected to one another via the channels 10, 20 and 30, with the flow of a medium passing through this device being controlled by means of the shut-off valves 13, 23 and 33. Sensors 15, 25 and 35, by means of which control functions can be brought about, can furthermore be provided in the channels 10, 20 and 30.

If a medium enters the channel 10 via the input A and the valve 13 is open, whereas the valves 23 and 33 are closed, it exits at the opening B. If, by contrast, the valve 13 is closed and the valve 23 is open, the medium passes via the connecting channel, wherein the valve 23 is located, into the channel 20 of the pipe length 2, wherein case it passes to one of the openings C and D. If the valve 13 is open and, furthermore, the valve 23 is closed and the valve 33 is open, the medium flows into the channel 30 of the pipe length 3, wherein case it passes to one of the openings E and F. It is also pointed out here that the valves 13, 23 and 33 may also be only partially open, as a result of which, in particular, quantity controls and temperature controls can be undertaken.

If the medium is introduced via the opening C, it passes either through the channel 20 to the opening D. If, by contrast, the valve 23 is open, the medium flows into the channel 10, from which it passes to the opening A. If the valve 13 is open, the medium can flow to the opening B. If the valve 33 is also open, the medium can flow through the channel 30 to the openings E and F.

The direction wherein the flow takes place in each case depends on through which of the adjoining lines continued flow is possible. Furthermore, the valves may also be partially open or closed.

Since analogous flows are possible between all six openings A to F, this device permits flows in 15 different routes, with it also being possible for the flows in these routes to take place in opposite directions in each case.

It is therefore possible to use this device, although it contains only three controllable valves, in particular shut-off valves, to bring about a multiplicity of control operations. Despite the fact that this device permits a multiplicity of different flows, it has a technically simple construction, as a result of which it can be produced cost-effectively. Since it also contains only three valves, the risk of malfunctions is correspondingly low. Instead of shut-off valves, it is also possible for other valves, such as, for example, pressure-reducing valves, regulating valves, overflow valves, nonreturn check valves, pressure-equalizing valves, to be provided. The valves may be produced from metal, in particular from brass, from ceramic or from plastics. In the case of installations for air conditioning, valves produced from plastics are advantageous, since condensation of water is avoided.

Figure 2:
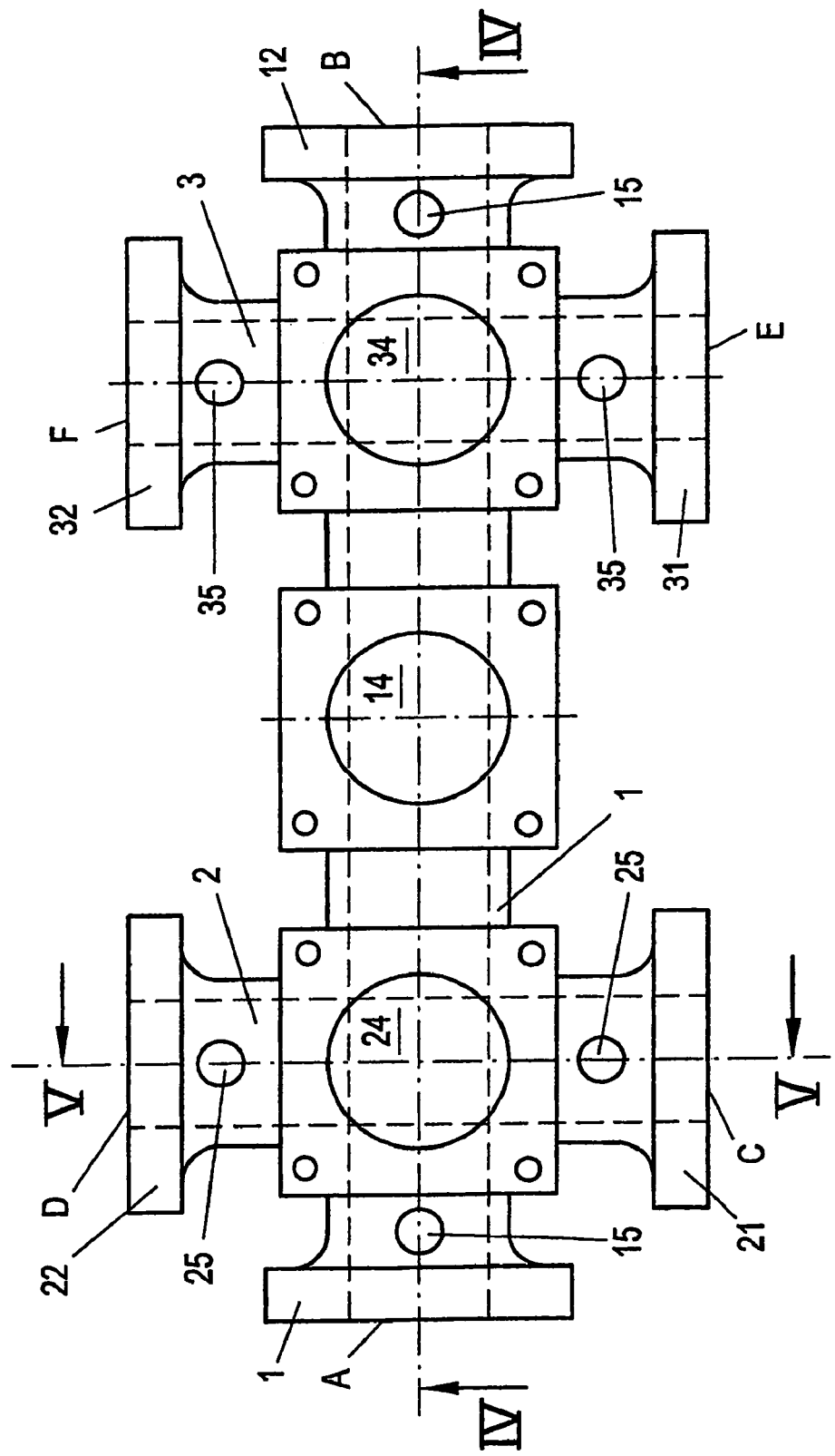
FIG. 2 is a plan view of the device of FIG. 1.
Figure 2A:
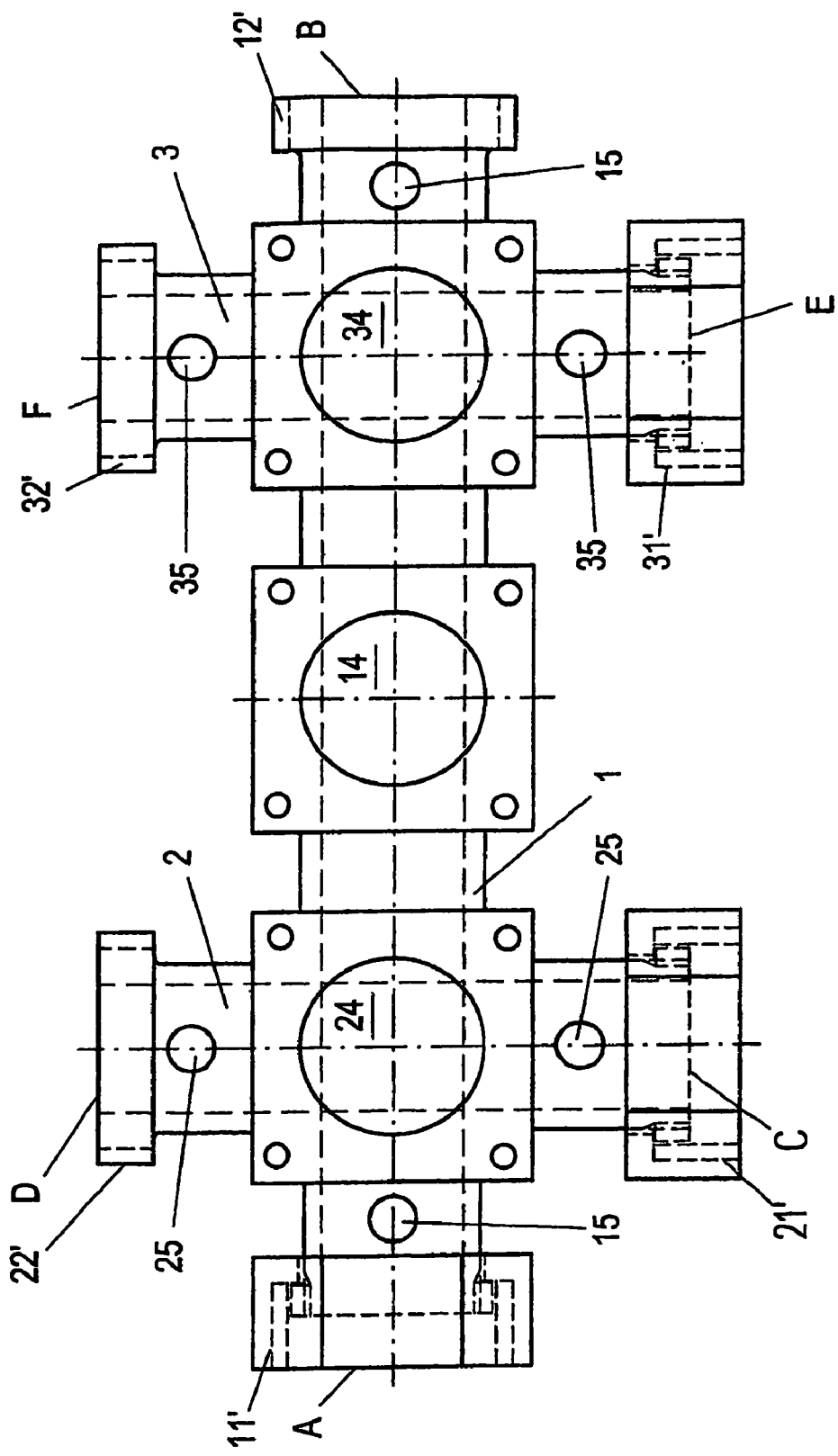
FIG. 2A is a plan view of a first variant embodiment of the device of FIG. 1.
Figure 3:
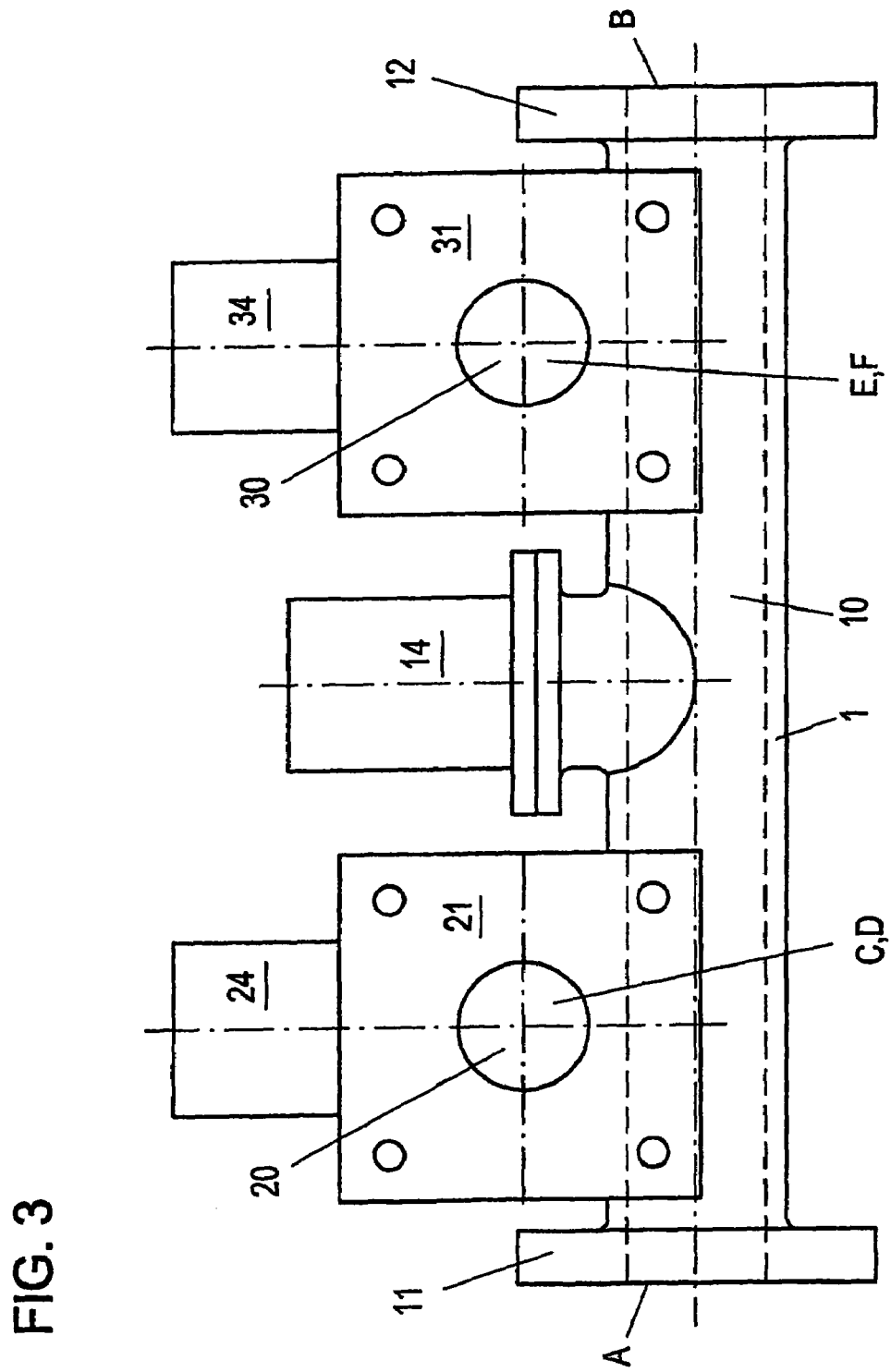
FIG. 3 is a side view of the device of FIG. 1.

The individual devices are connected to one another by means of the connecting flanges 11, 21, 31 and 12, 22, 32 or by means of the external thread 11', 21', 31' illustrated in FIG. 2A and the union nuts 12', 22', 32' assigned to the latter.

Figure 4:
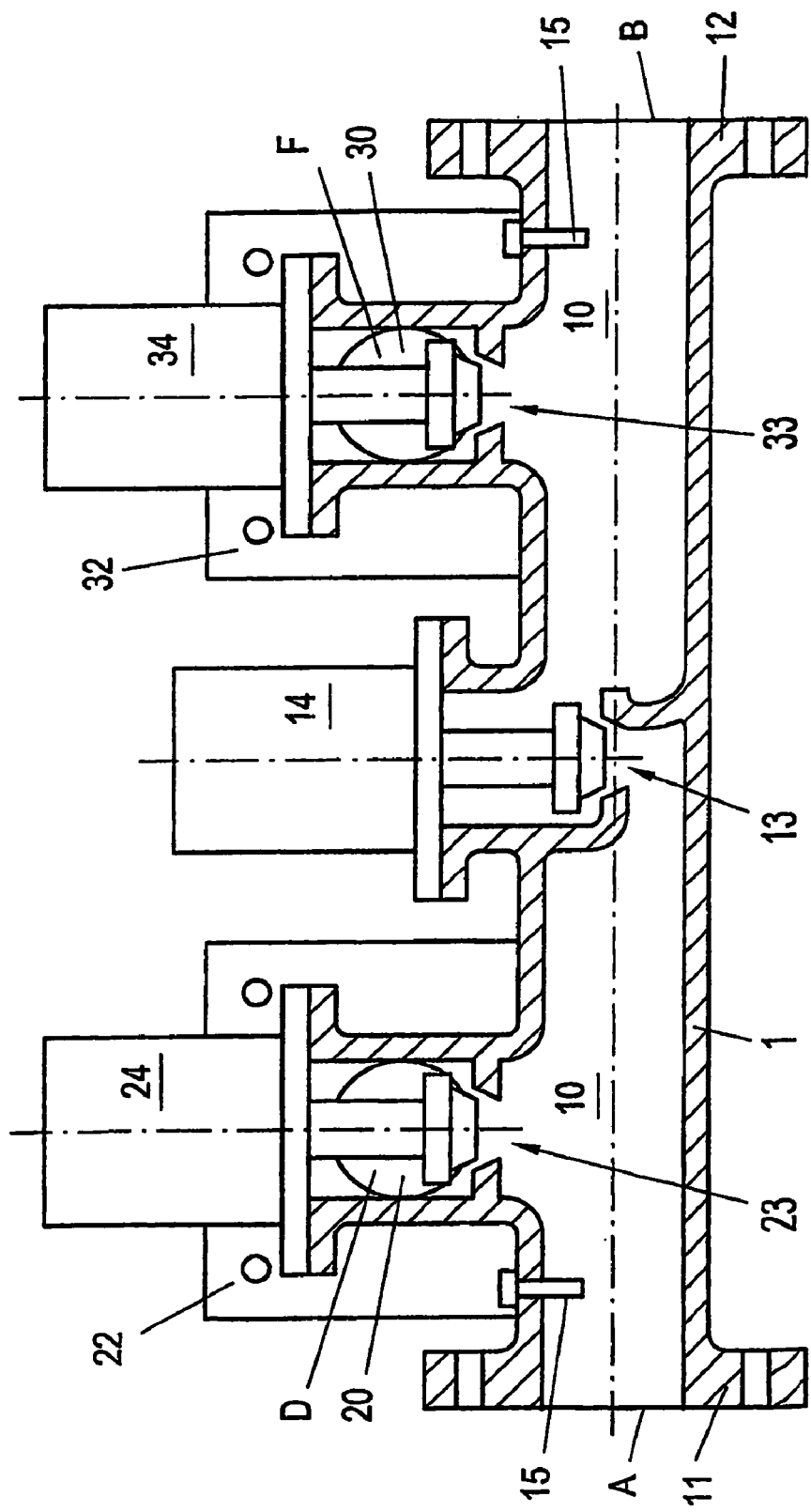
FIG. 4 shows the device shown in FIG. 1, in section along the line IV—IV in FIG. 2.
Figure 4A:
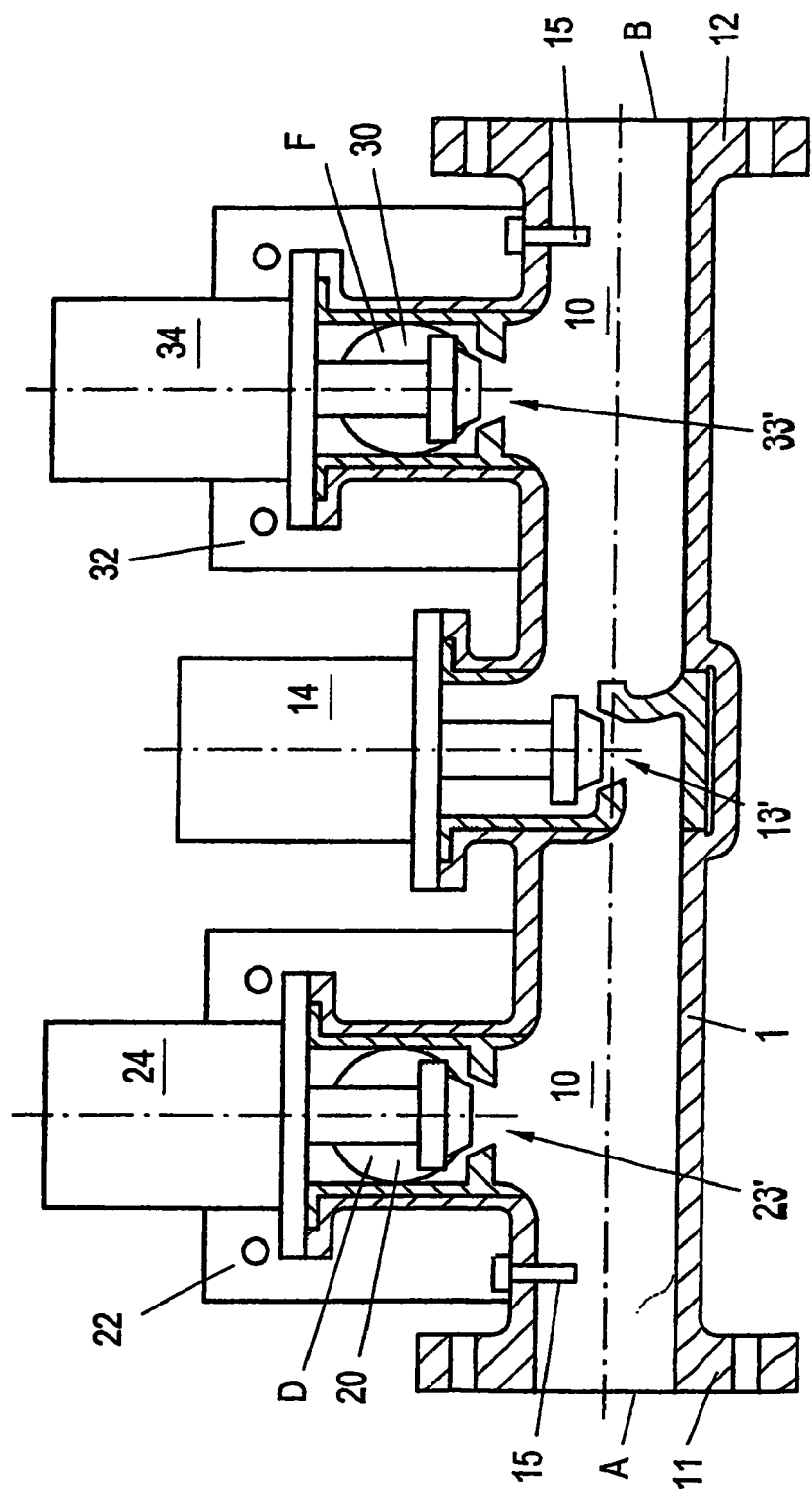
FIG. 4A shows a second variant embodiment shown in FIG. 1, in section along the line IV—IV in FIG. 2.
Figure 5:
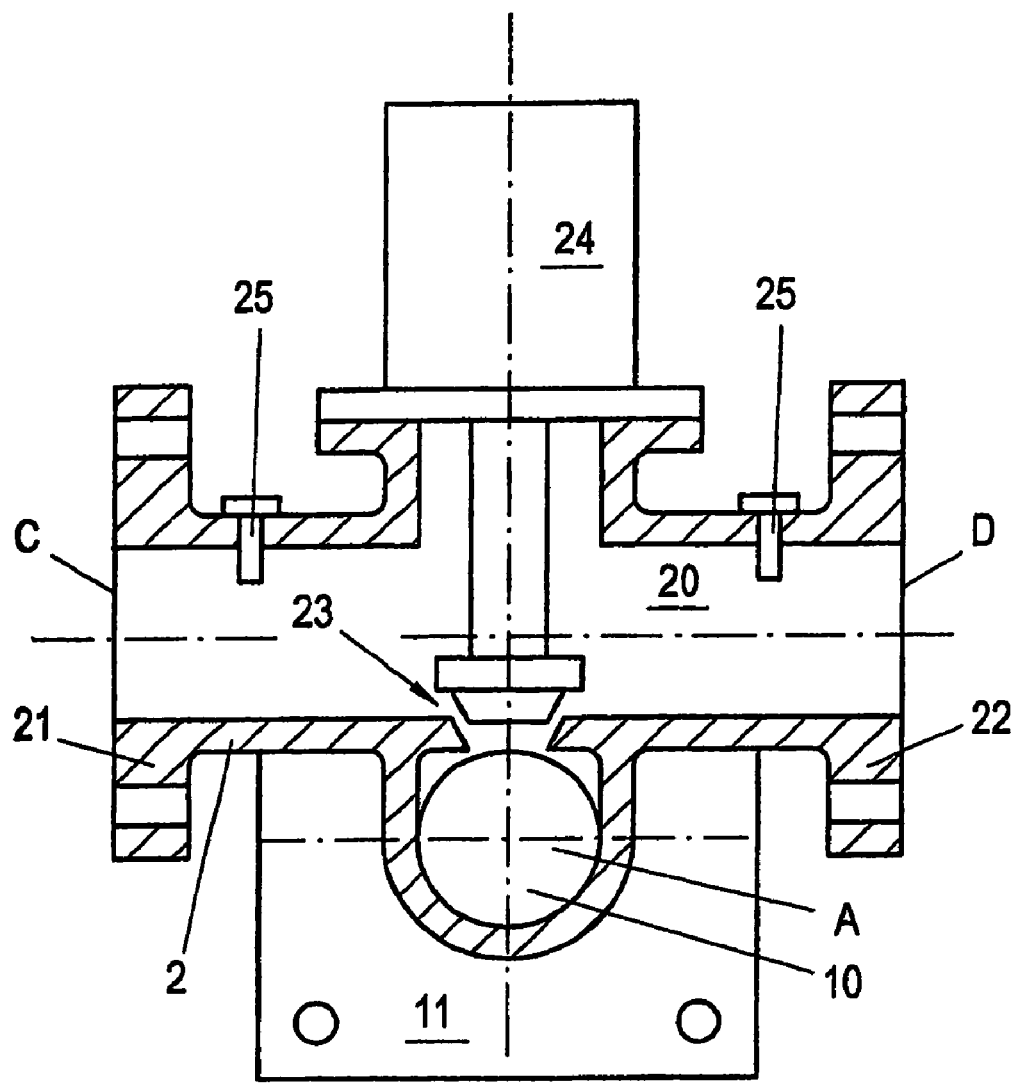
FIG. 5 shows the device shown in FIG. 1, in section along the line V—V in FIG. 2.
Figure 6:
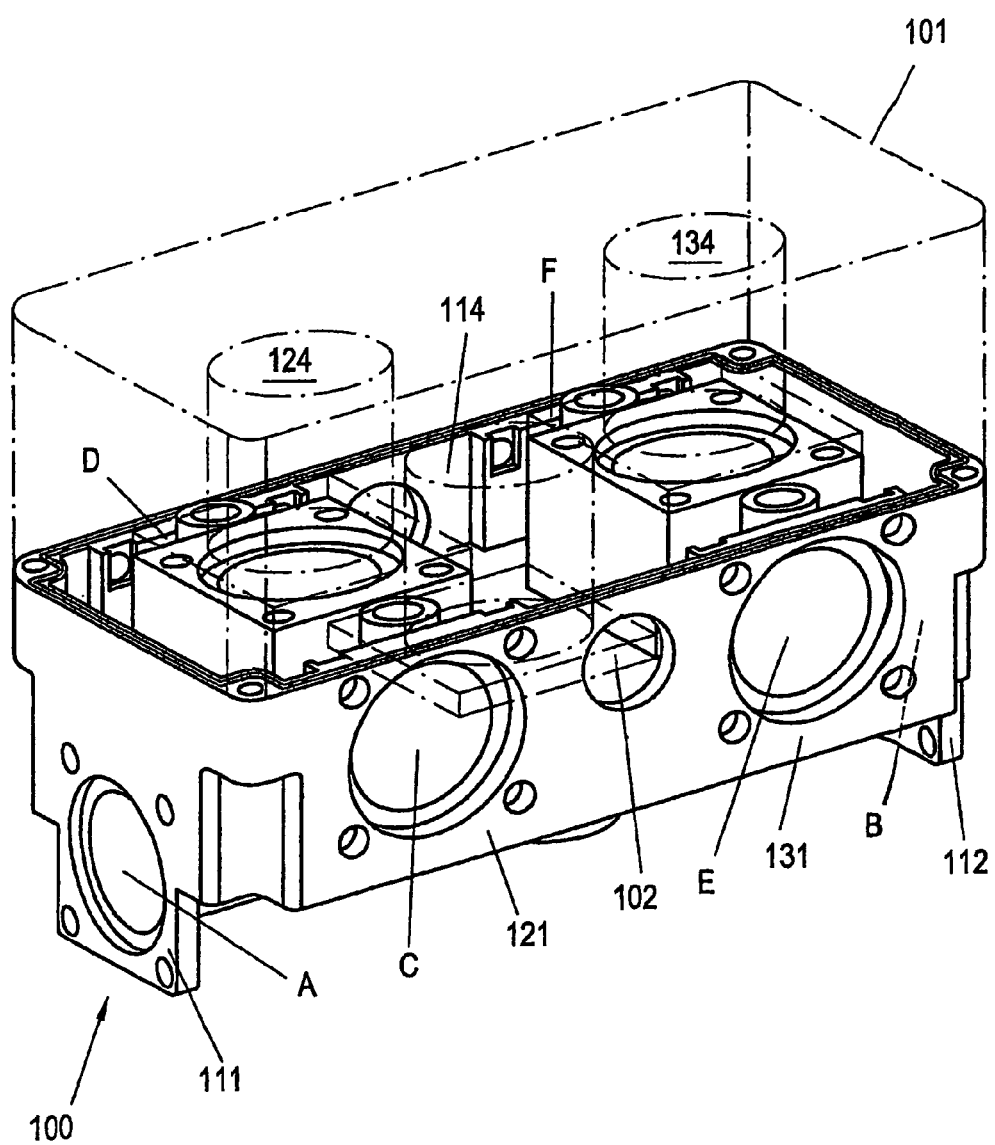
FIG. 6 shows a second embodiment of a device according to the invention, in an axonometric illustration.
Figure 7:
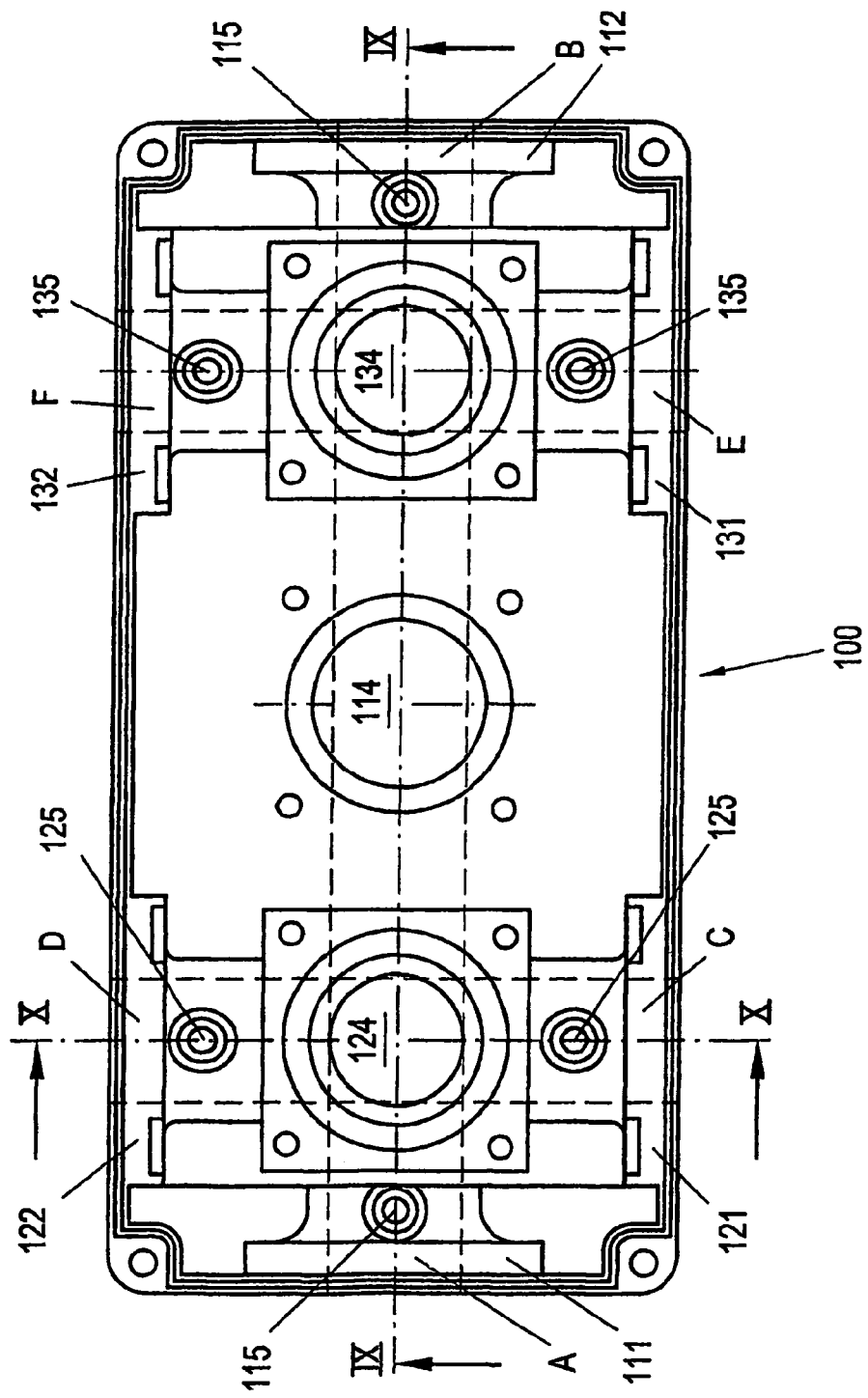
FIG. 7 is a plan view of the device shown in FIG. 6.
Figure 8:
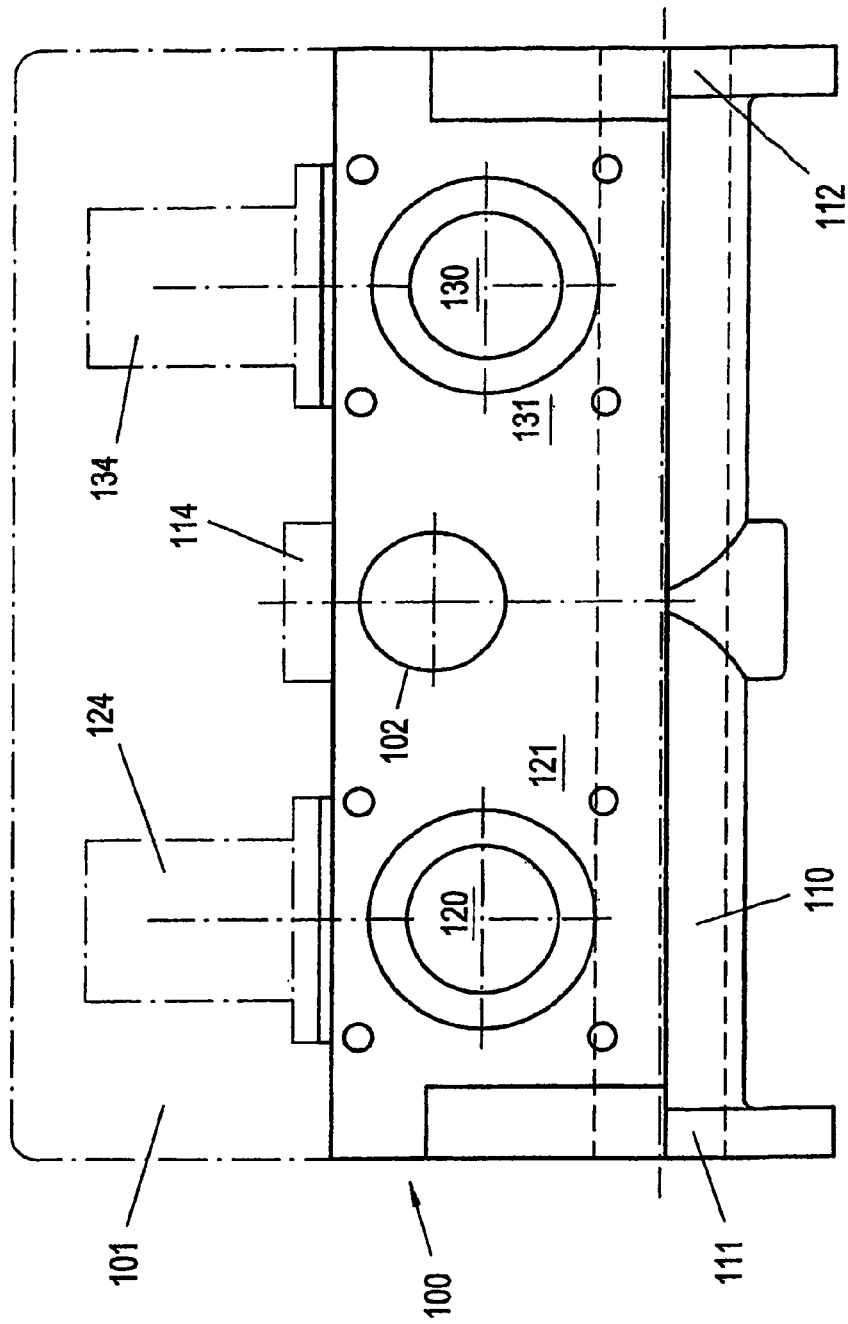
FIG. 8 is a side view of the device shown in FIG. 6.
Figure 9:
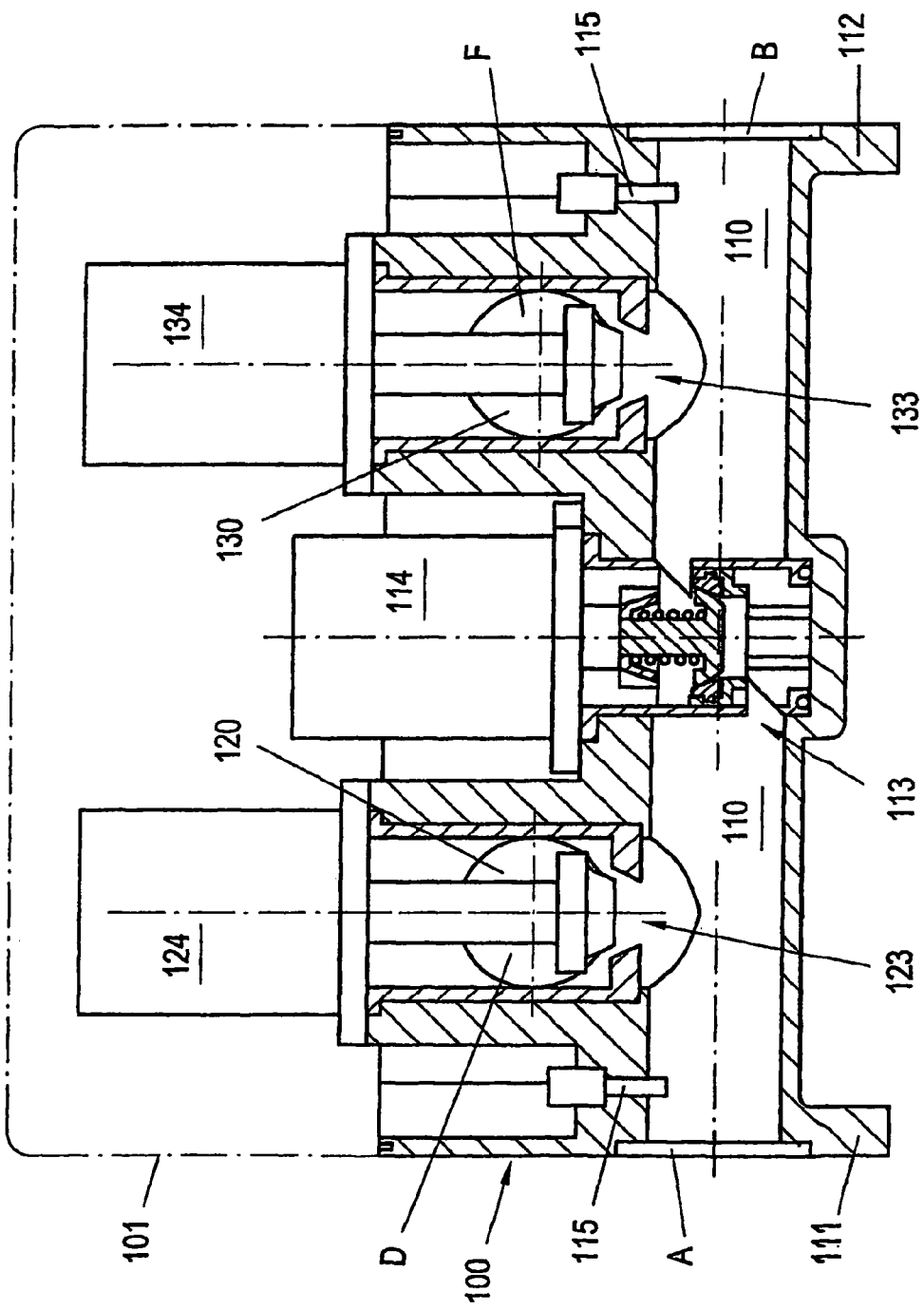
FIG. 9 shows the device shown in FIG. 6, in section along the line IX—IX in FIG. 7.
Figure 10:
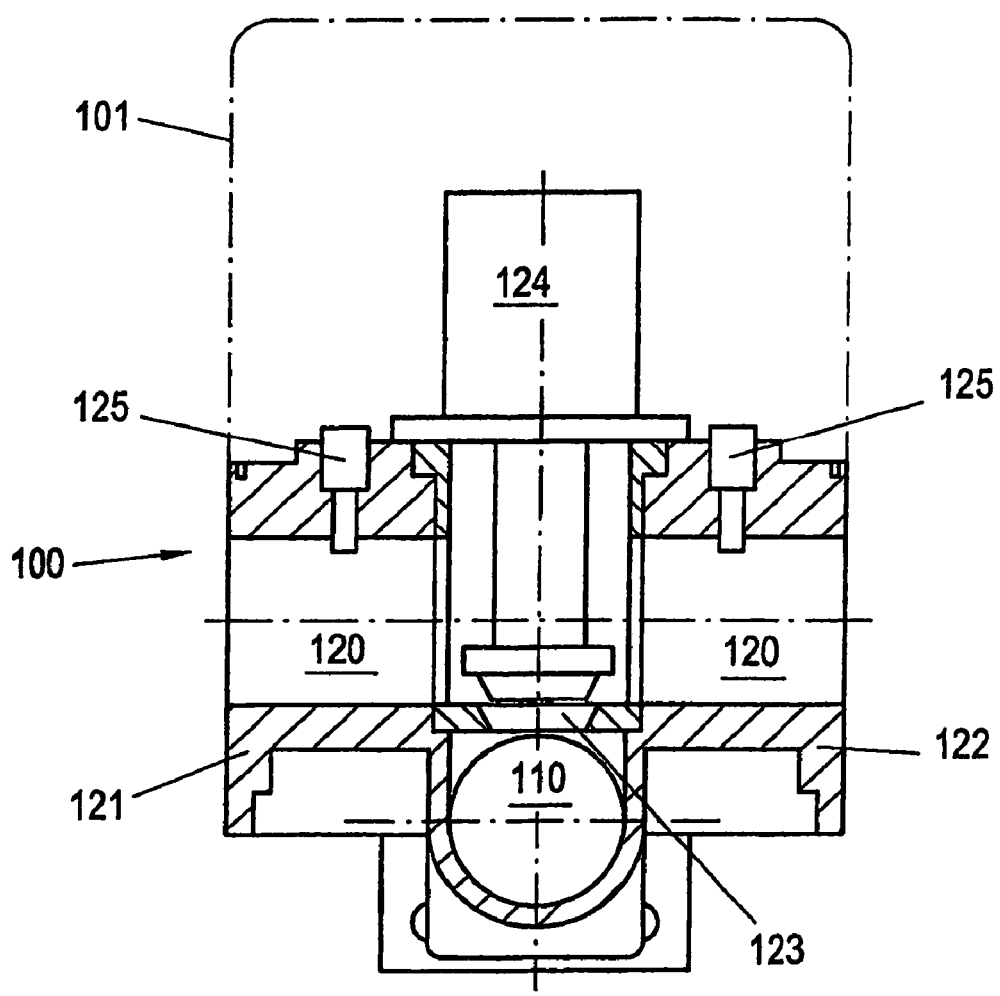
FIG. 10 shows the device shown in FIG. 6, in section along the line X—X in FIG. 7.

FIG. 4A illustrates a further variant embodiment, wherein the valves 13', 23' and 33' are inserted in an exchangeable manner into the pipe lengths 1, 2 and 3.

The basic construction of a device of this type is illustrated with reference to FIGS. 1 to 5. A device of this type which is produced in a cost-effective manner from plastics is explained below. In this case, a housing 100 made of plastics, in particular of glass-fiber-reinforced polyphthalimide, is produced in an injection-molding process, with the channels being located within this housing 100 and the valves, which are composed in particular of brass, of plastics or of ceramic, being inserted into the housing.

As is apparent from FIGS. 6 to 10, this device comprises a housing 100 which is constructed with a first channel 110 and with two further channels 120 and 130 constructed at right angles to the latter, with connecting plates 111, 112 and 121, 122 and 131, 132, to which connecting lines can be fastened, being located at the ends of the channels 110, 120 and 130. The top side of the housing 100 is sealed off by a waterproof seal 101. Furthermore, the housing 100 is constructed with a channel 102 which is used to accommodate electric control lines inserted in a moisture-proof manner.

Located within the flow channel 110 is a valve 113 to which a control device, for example an electric servomotor 114, is assigned. The flow channel 110 is connected via connecting channels to the flow channels 120 and 130, with further valves 123 and 133 to which control devices, for example electric servomotors 124 and 134, are assigned being located within the connecting channels.

This device likewise has six inputs and outputs A, B, C, D, E and F which are connected to one another via the channels 110, 120 and 130, with the flow of a medium passing through this device being controlled by means of the valves 113, 123 and 133. Furthermore, sensors 115, 125 and 135, by means of which control functions can be brought about, can be provided in the channels 110, 120 and 130. The valves may be formed by shut-off valves, pressure-reducing valves, regulating valves, overflow valves, nonreturn valves, pressure-equalizing valves or the like.

If a medium enters the channel 110 via the input A and the valve 113 is open, whereas the valves 123 and 133 are closed, it exits at the opening B. If, by contrast, the valve 113 is closed and the valve 123 is open, the medium passes via the connecting channel, wherein the valve 123 is located, into the channel 120, wherein case it passes to one of the openings C and D. If the valve 113 is open and, furthermore, the valve 123 is closed and the valve 133 is open, the medium flows into the channel 130, wherein case it passes to one of the openings E and F.

If the medium is introduced via the opening C, it passes either through the channel 120 to the opening D. If, by contrast, the valve 123 is open, the medium flows into the channel 110, from which it passes to the opening A. If the valve 113 is open, the medium can flow to the opening B. If the valve 133 is also open, the medium can flow through the channel 130 to the openings E and F.

The direction wherein the flow takes place in each case depends on through which of the adjoining lines continued flow is possible.

Since analogous flows are possible between all six openings A to F, this device permits flows in 15 different routes, with it also being possible for the flows in these routes to take place in opposite directions in each case. Since, furthermore, the valves may also be partially open or closed, a multiplicity of controls in terms of quantities of the flowing medium and in terms of temperatures are possible. This device can thereby be used in a multiplicity of installations.

It is therefore possible to use this device, although it contains only three controllable valves, to bring about a multiplicity of control operations. Despite the fact that this device permits a multiplicity of different flows, it has a technically simple construction, as a result of which it can be produced cost-effectively. Since it also contains only three valves, the risk of malfunctions is correspondingly low.

In the case of known line systems, the lines are located essentially in one plane, with the connections also being located in this plane. The high functionality of the present device is obtained by the fact that, in contrast, the lines are arranged in two planes located one above the other, with lines which are located one above another intersecting and connecting channels each containing a valve being provided at the intersection points. This creates a three-dimensional line system, wherein the medium can flow from a first plane into a second plane. This gives rise to the high functionality which has been explained.

The number of different courses of flow can be further increased by further devices of this type being fitted, as a result of which a multiplicity of technical requirements can be met. In order to permit maximum variations, the individual pipe lengths preferably have the same diameter.

The use of two such devices which are connected to each other, as shown in FIGS. 1 to 6, in a heating installation which is formed with a device for venting the installation is explained in more detail below.

Figure 11:
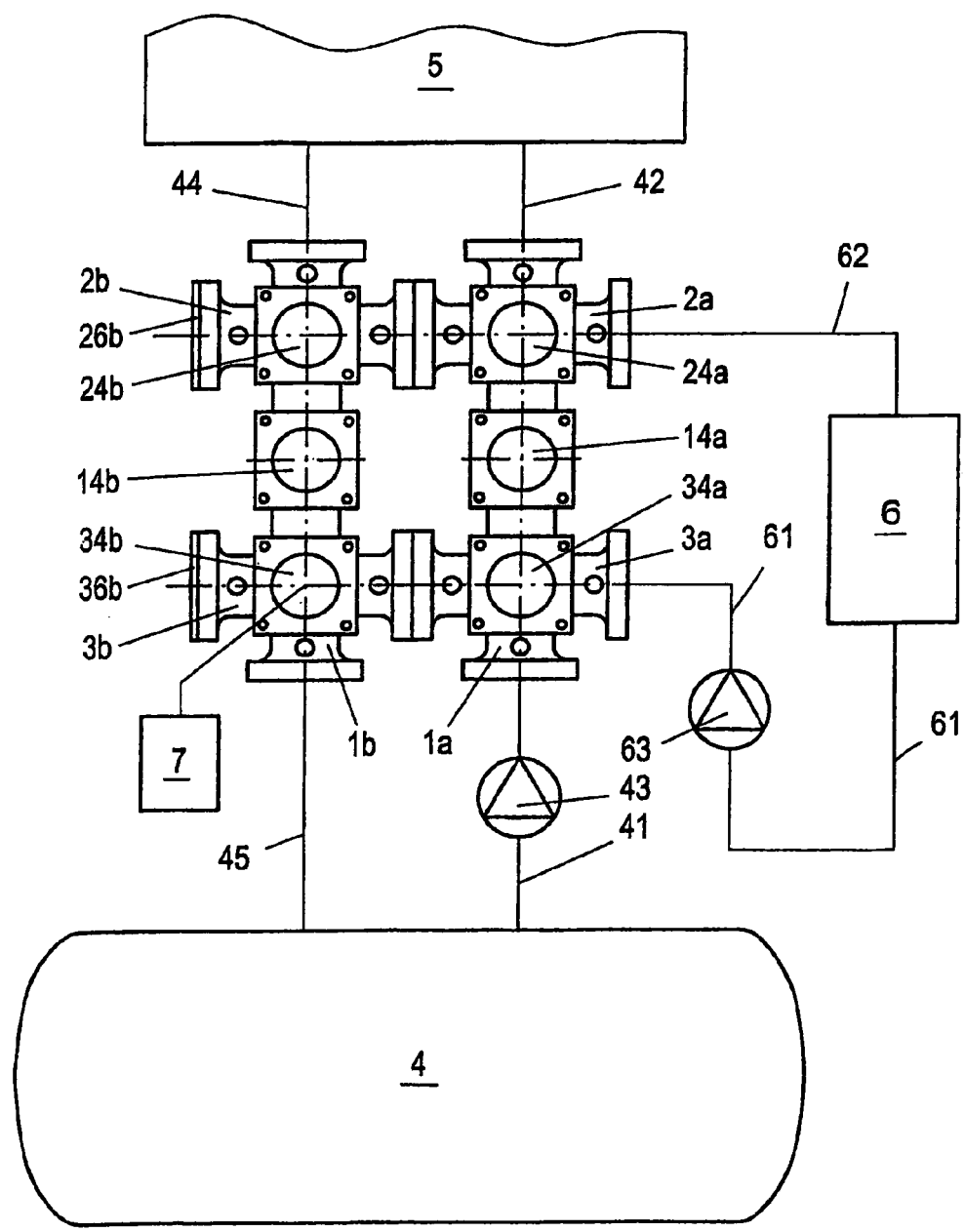
FIG. 11 shows a heating installation with the first embodiment of a device according to the invention.

FIG. 11 illustrates a heating installation which contains a heating boiler 4, a consumer circuit 5 and a venting device 6. Located in the flow lines 41 and 42 to the consumer circuit 5 is a pump 43 by means of which the heating medium is conveyed into the consumer circuit 5, with it flowing back to the heating boiler 4 via the lines 44 and 45. The venting device 6 is connected to the lines 41, 42 and 43, 44 via lines 61 and 62. Furthermore, a pump 63 is located in the line 61. The connection of the lines 41 and 42 to the lines 61 and 62 is brought about by means of two control devices according to the invention, the components of which are indicated by the reference numbers shown in FIGS. 1 to 5, but with the letters a and b added. These devices are assigned a control unit 7. The openings which are not required are closed by covering plates 26b and 36b.

Figure 11A:
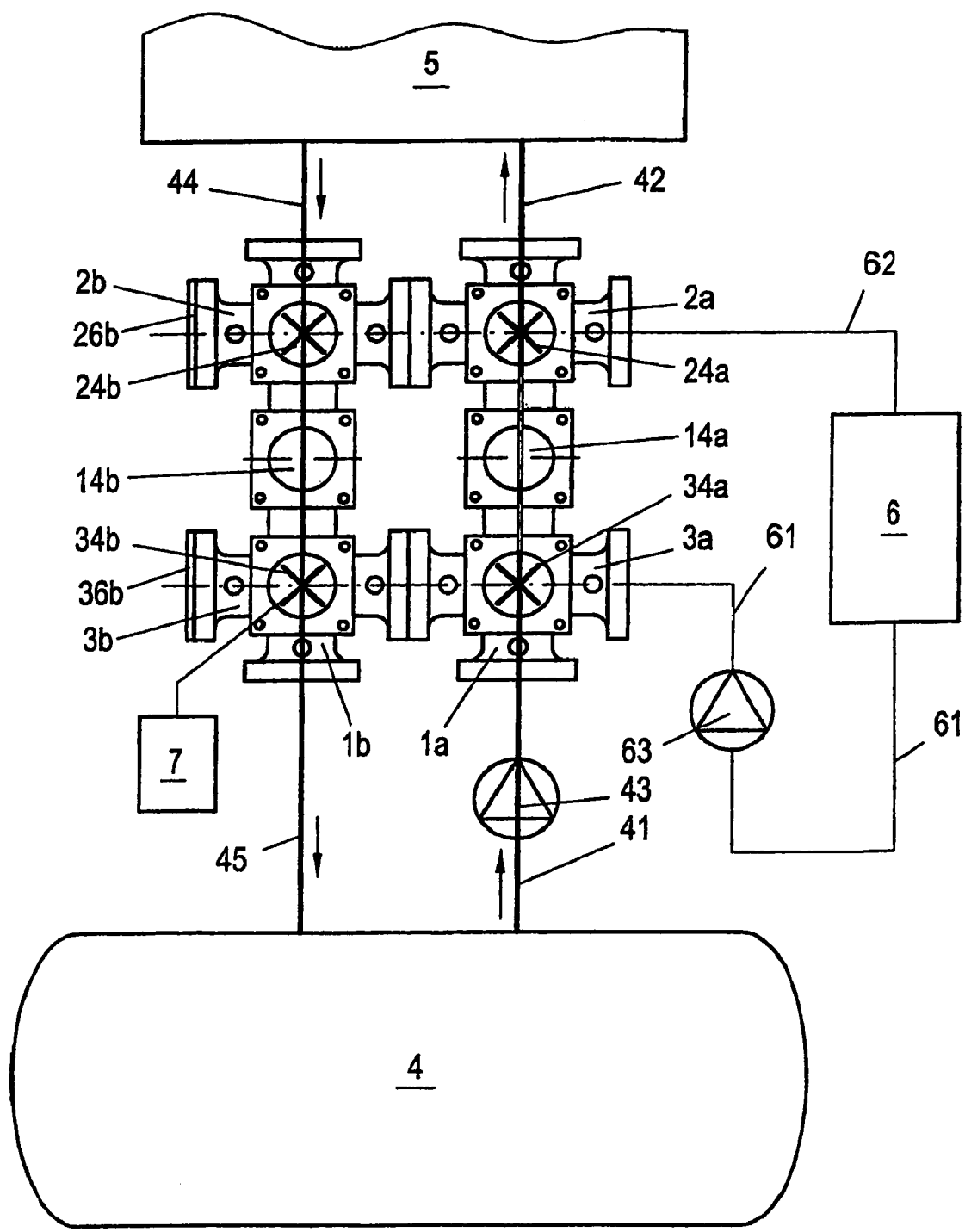
FIGS. 11A to 11E show the heating installation from FIG. 11 with two devices according to the invention which take up five different switching positions, as a result of which five different operating modes are made possible.

The operation of the device according to the invention will now be explained below with reference to FIGS. 11A to 11E:

In the heating mode, which is illustrated in FIG. 11A, the valves assigned to the control devices 34a and 24a and 24b and 34b are closed, whereas the valves assigned to the control devices 14a and 14b are open. The heating medium is thereby conveyed out of the heating boiler 4 by means of the pump 43 through the line 41 and the pipe length 1a and passes via the line 42 into the consumer circuit 5, wherein it flows back again into the heating boiler 4 via the line 44, the tube 1b and the line 45.

Figure 11B:
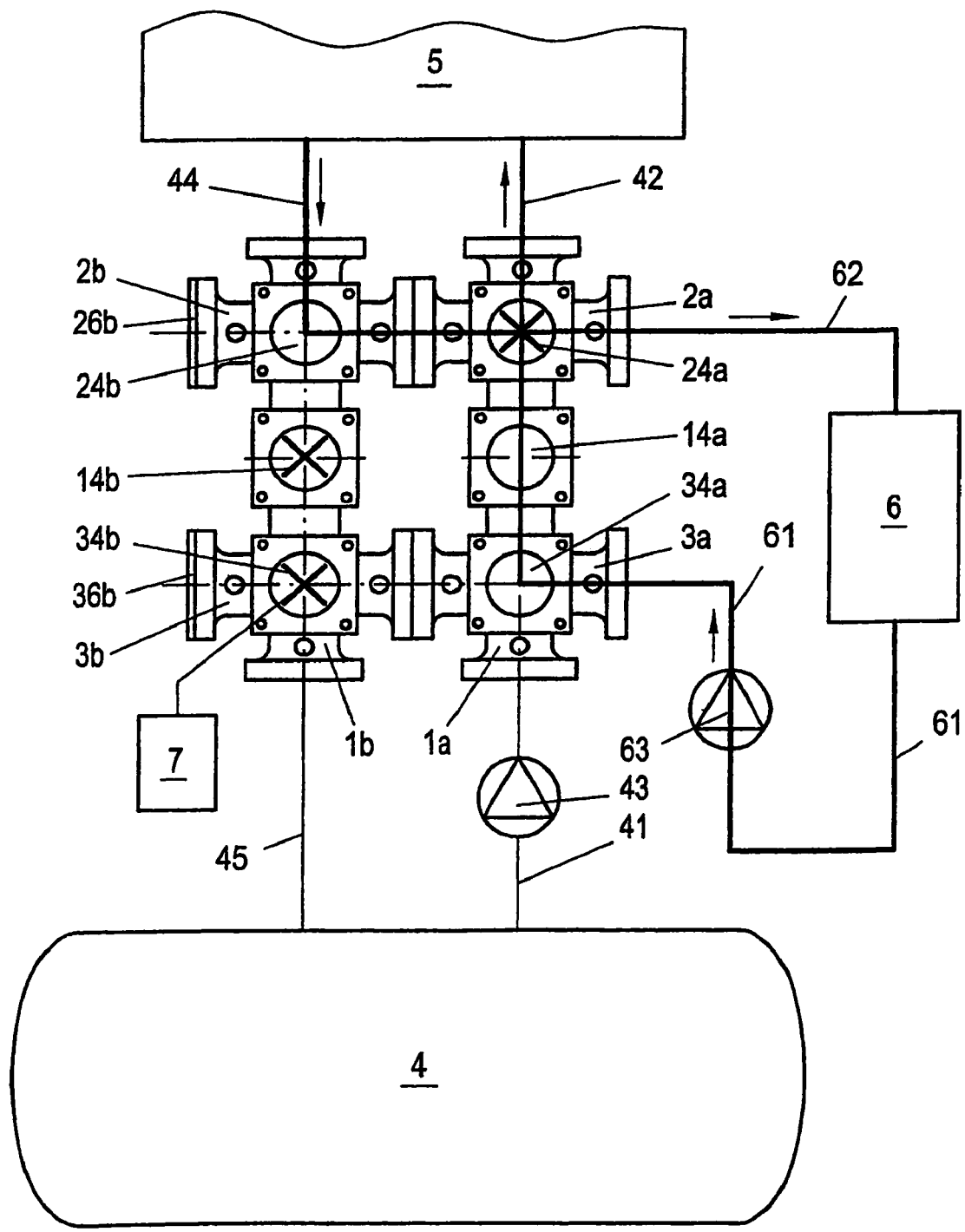

If, by contrast, as is illustrated in FIG. 11B, the heating medium located in the consumer circuit 5 is to be conducted through the device 6 in order to vent it, the valves assigned to the control devices 34a and 14a are open whereas the valve assigned to the control device 24a is closed. Furthermore, the valve assigned to the control device 24b is open and the valves assigned to the control devices 14b and 34b are closed.

The heating medium located in the system is thereby conveyed by means of the pump 63 via the line 61 into the pipe length 3a, from which it passes via the pipe length 1a and via the line 42 into the heating circuit 5. From the heating circuit 5, the heating medium passes via the line 44 into the pipe length 1b. It passes from the latter into the pipe lengths 2b and 2a and back via the line 62 into the device 6, wherein it is vented.

Figure 11C:
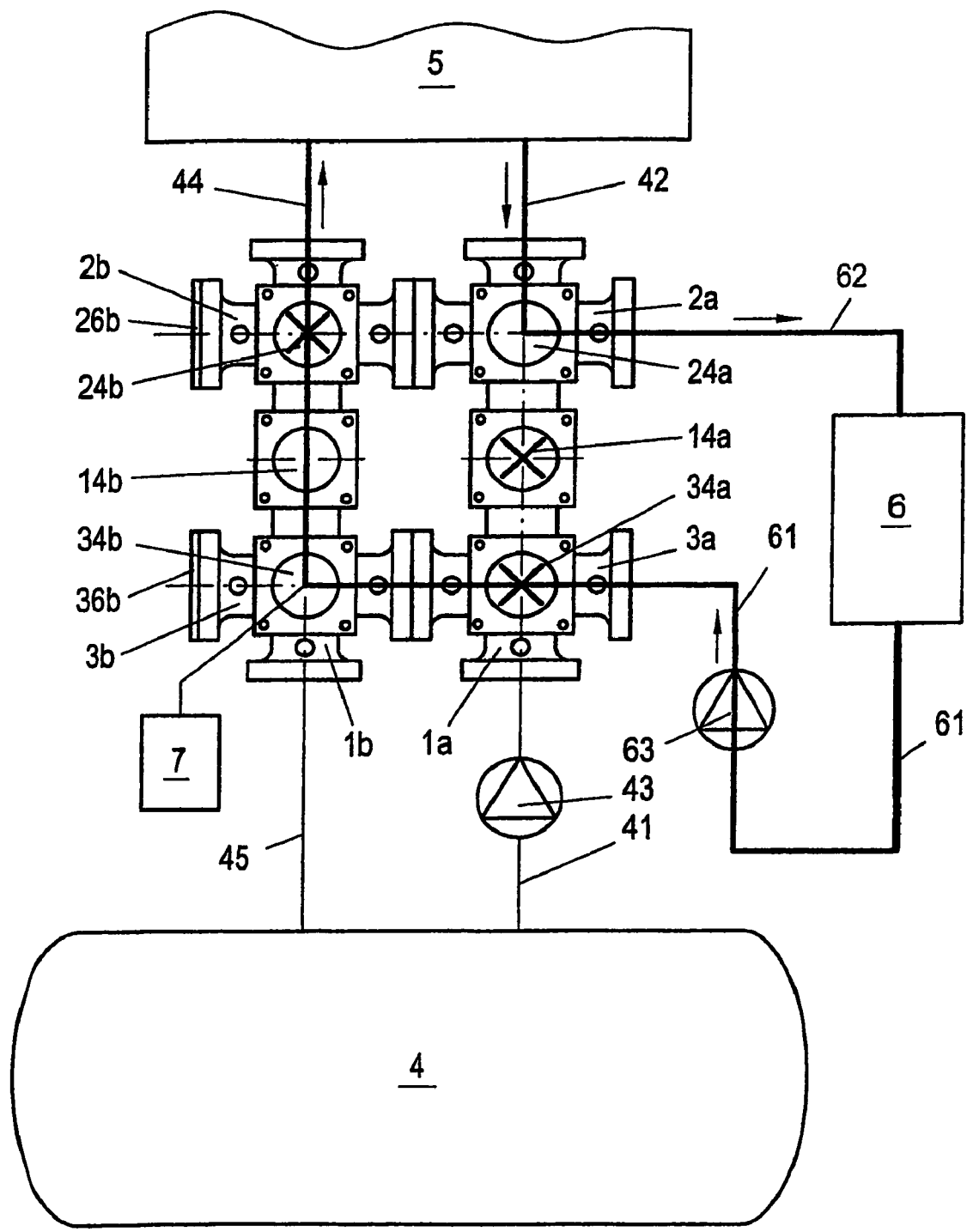

In FIG. 11C, the valves are controlled in such a manner that the heating medium flows through the consumer circuit 5 in the opposite direction. For this purpose, the valves assigned to the control devices 34b, 14b and 24a are open whereas the valves assigned to the control devices 34a, 24b and 14a are closed. The flow thus takes place via the line 61, the pipe length 3a, the pipe length 3b, the pipe length 1b and the line 44 into the consumer circuit 5, with the return flow to the venting device 6 taking place via the line 42, the pipe length 1a and the pipe length 2a and also the line 62.

Figure 11D:
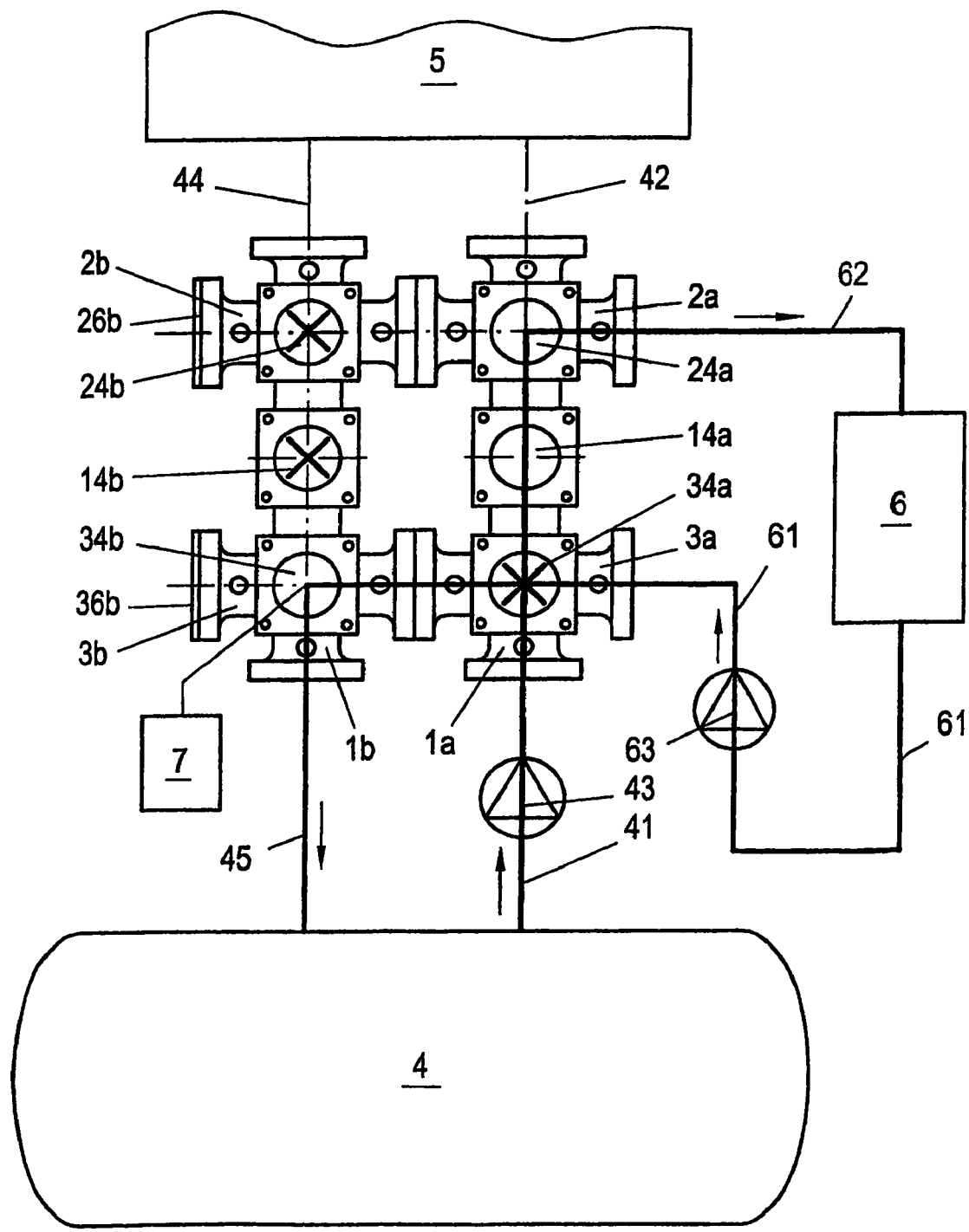
Figure 11E:
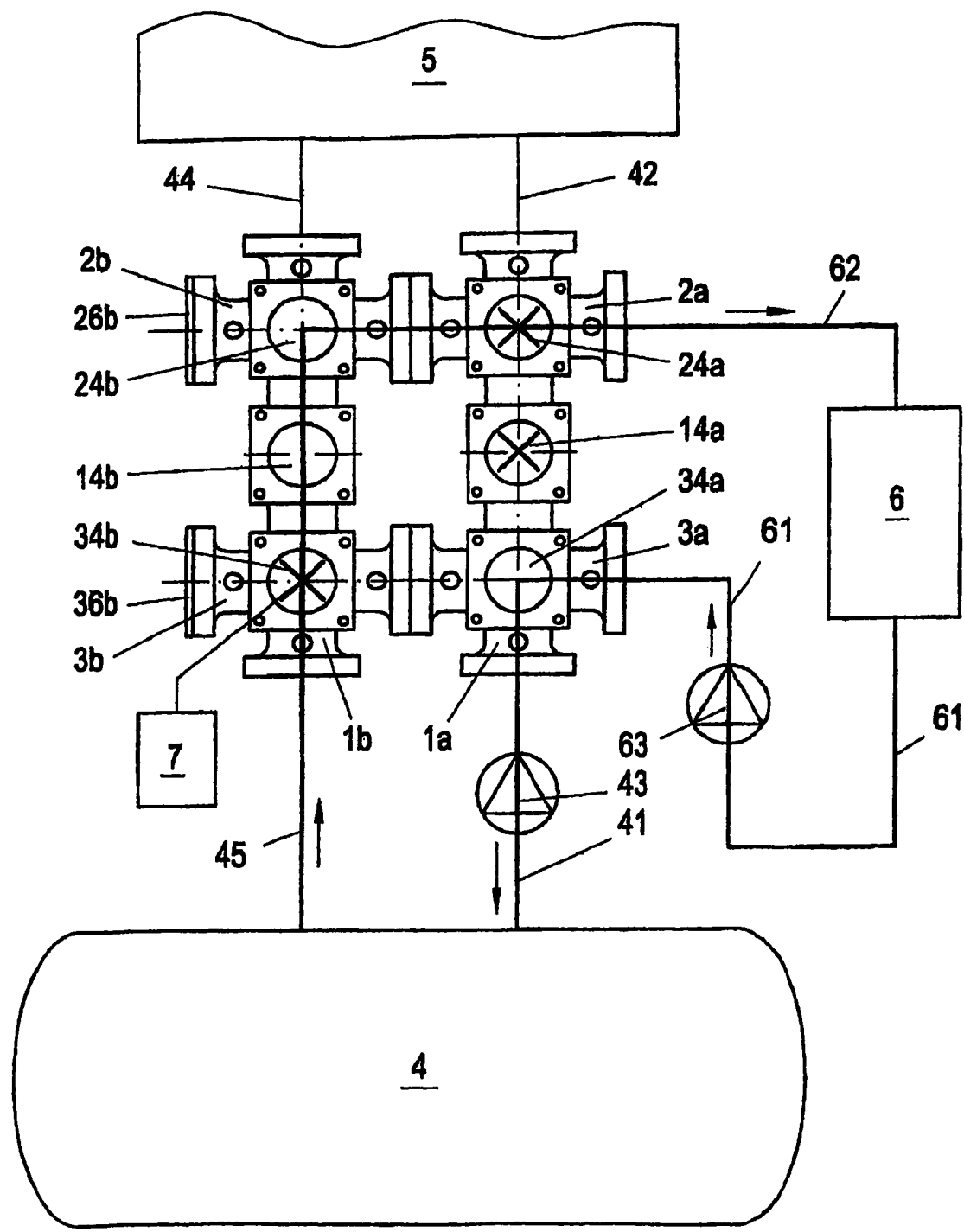

In an analogous manner, as is illustrated in FIG. 11D, a flushing of the heating boiler 4 takes place in order to remove air contained therein via the line 61, the pipe lengths 3a and 3b, the pipe length 1b and the line 45 into the heating boiler 4 and via the line 41, the pipe length 1a and the line 62 back into the venting device 6, wherein case the valves assigned to the control devices 34a, 14b and 24b are closed and the valves assigned to the control devices 34b, 14a and 24a are open.

A flushing of the heating boiler 4 in the opposite direction, which is illustrated in FIG. 1E, presupposes that the valves assigned to the control devices 34a, 14b and 24b are open whereas the valves assigned to the control devices 34b, 24a and 14a are closed.

It can be seen from this example that, by means of the combination of pipe lengths located one above another together with the valves located therein and in the connecting channels, a plurality of operations are possible which, in the case of known line arrangements with three-way directional control valves, would require a substantially larger number of valves. By means of further combinations of devices of this type, it is possible for a very large number of control functions to be carried out in a simple manner. In order to permit any desired combinations, all of the pipe lengths preferably have the same diameter.

The connecting elements may be formed by connecting plates or by threaded components, on the one hand, and union nuts, on the other hand. The control devices may be formed by thermocouples or by servomotors. In addition, a manual control of the valves may also be provided. The valves are formed by shut-off valves, pressure-reducing valves, regulating valves, overflow valves, check valves, nonreturn valves, pressure-compensating valves or the like.

The sensors make it possible for the valves to be controlled as a function of parameters, for example the quantities or the temperatures, of the media flowing in the pipe lengths, with the outputs of the sensors being connected to an electronic control unit.

I claim:

1. A device for controlling a flow of fluidic media, comprising:
    a single first channel with two ends and a first valve connected in said first channel;
    flow connections at said two ends of said first channel;
    two mutually parallel, second channels extending substantially perpendicularly to said first channel;
    said first channel being located at a distance from a plane formed by said two second channels;
    second valves connecting said first channel with said two second channels; and
    wherein said first valve in said first channel is disposed between said second valves leading to said two second channels.

2. The device according to claim 1, configured for controlling liquid heating or cooling media.

3. The device according to claim 1, wherein said first valve in said first channel and said second valves leading to said second channels are shut-off valves.

4. The device according to claim 1, wherein at least some of the valves are constructed with a respective control device.

5. The device according to claim 1, wherein said first valve is disposed in said first channel substantially centrally between said two second channels.

6. The device according to claim 1, which comprises sensors disposed in said first and second channels.

7. The device according to claim 1, wherein said first and second channels have respective connections (11, 12, 21, 22, 31, 32) at ends thereof.

8. The device according to claim 7, wherein said connections (11, 12, 21, 22, 31, 32) are flanges formed at said ends of said first and second channels.

9. The device according to claim 1, wherein each of said channels has a first end with a union nut and a second end with an internal thread.

10. The device according to claim 1, wherein said valves are exchangeable valves inserted into a valve housing.

11. The device according to claim 1, wherein said first and second channels have substantially identical flow cross sections.

12. The device according to claim 1, wherein said first and second channels are formed in a body of a plastics material and said valves are inserted in said body.

13. The device according to claim 12, wherein said plastics material is a glass-fiber-reinforced polyphthalimide.

* * * * *